(12) United States Patent
Gonthier et al.

(10) Patent No.: US 6,850,654 B2
(45) Date of Patent: Feb. 1, 2005

(54) PASSIVE THERMAL COMPENSATION OF ALL-FIBER MACH-ZEHNDER INTERFEROMETER

(75) Inventors: Francois Gonthier, Montreal (CA); Francois Seguin, Montreal (CA); Nicolas Godbout, Montreal (CA); Alain Villeneuve, Montreal (CA)

(73) Assignee: ITF Optical Technologies Inc., Montreal (CA)

( * ) Notice: Subject to any disclaimer, the term of this patent is extended or adjusted under 35 U.S.C. 154(b) by 0 days.

(21) Appl. No.: 10/258,913

(22) PCT Filed: Feb. 8, 2002

(86) PCT No.: PCT/CA02/00148

§ 371 (c)(1),
(2), (4) Date: Oct. 31, 2002

(87) PCT Pub. No.: WO02/065179

PCT Pub. Date: Aug. 22, 2002

(65) Prior Publication Data

US 2003/0152304 A1 Aug. 14, 2003

(30) Foreign Application Priority Data

Feb. 9, 2001  (CA) ............................................. 2335216

(51) Int. Cl.[7] ................................................ G02F 1/01
(52) U.S. Cl. ........................................... 385/1; 356/477
(58) Field of Search .......................... 385/1, 128, 142; 356/497, 477

(56) References Cited

U.S. PATENT DOCUMENTS 4,725,141 A    2/1988  Georgiou et al. ........... 356/345
5,295,205 A    3/1994  Miller et al. ..................... 385/1
5,636,309 A    6/1997  Henry et al. ................. 385/129
5,703,975 A   12/1997  Miller et al. ................... 385/16
5,710,848 A    1/1998  Dumais et al. ................. 348/43
5,920,666 A *  7/1999  Digonnet et al. ............. 385/16
5,943,458 A    8/1999  Miller .......................... 385/39
6,031,948 A    2/2000  Chen ........................... 385/24
6,118,909 A    9/2000  Chen et al. ................... 385/15
6,201,918 B1 * 3/2001  Berkey et al. .............. 385/128

FOREIGN PATENT DOCUMENTS

EP    0849231    6/1998    ........... C03B/19/14
EP    0982607    3/2000    ........... G02B/6/122
EP    1065539    1/2001    ............ G02B/6/28

OTHER PUBLICATIONS

Bilodeau et al.; Ultraviolet–light photosensitivity in . . . ; Oct. 15, 1990; pp. 1138–1140; Optics Letters / vol. 15, No. 20.

Malo et al.; Unbalanced Dissimilar–Fibre Mach–Zehnder Interferometer; Oct. 12, 1989; pp. 1416–1417; Electronics Letters / vol. 25, No. 21.

* cited by examiner

Primary Examiner—Frank G. Font
Assistant Examiner—Michael P. Mooney
(74) Attorney, Agent, or Firm—George J. Primak

(57) ABSTRACT

The invention provides an all-fiber Mach-Zehnder interferometer in which the composition of one of the arms, which connect the couplers, or of a segment of such arm, is doped with dopants, such as $GeO_2$, $P_2O_5$, $B_2O_3$ and F. The doping is adjusted to obtain a desired thermal dependence of the interferometer within a given temperature range. The segments can further be tapered with an adiabatic taper.

20 Claims, 4 Drawing Sheets

PASSIVE THERMAL COMPENSATION OF ALL-FIBER MACH-ZEHNDER INTERFEROMETER

FIELD OF THE INVENTION

This invention relates to a Mach-Zehnder interferometer, which has two fused-fiber couplers, interconnected by two optical fibers that provide both a phase shift and a thermal compensation for the interferometer.

In particular, it relates to a passive thermal compensation of the Mach-Zehnder interferometer (MZI), taking advantage of thermo-optic properties of specially designed optical fibers which interconnect the two couplers and which allow to control the MZI within a desired temperature range.

BACKGROUND OF THE INVENTION

All-fiber Mach-Zehnder interferometers typically include two optical couplers separated by a phase shift region, which comprises two optical fibers that interconnect, said couplers. The two fibers, which are often referred to as "arms" have different optical path lengths so that optical signals propagate through them at different velocities in the phase shift region. Light launched into the device passes through the first coupler where it is split and led through the pair of optical fibers. Both lightwaves are then coupled again by the second coupler and taken out as an optical signal output from the two output ports of the second coupler. If the light portions recombining at the second coupler are in phase, they constructively interfere at one of the output ports of the second coupler; if they are not in phase, in particular if the two light portions incur a π differencing phase shift, they combine constructively at the other output port of the second coupler.

Mach-Zehnder interferometers are known for their narrow band capabilities. For example, they can be used in dense wavelength division multiplexer (DWDM) optical communication systems. For this purpose, they must be stable over a range of environmental conditions, such as temperatures, within a defined range, and during presence of temperature variations. However, the refractive indices or the optical path lengths of the two connecting fibers of the device between the two couplers will usually vary with temperature. If the temperature dependence of the indices of refraction of the two fibers is not equal or if the optical paths of the two fibers are not equal, the temperature variations will cause variations in the differential phase shift. Consequently, the channel spacing of the device, defined as the wavelength separation between the transmission peaks of wavelengths of two adjacent channels, as well as the wavelength peaks and passband, become unstable, which causes significant problems for DWDM applications due to the small separation between channels in DWDMs.

In view of the importance of MZ-type interferometer devices, it is highly desirable to have available such devices that can exhibit stable performance even in the presence of some thermal disturbances. This can be achieved by compensating for the temperature induced shift so as to maintain the optical path length difference unchanged as the temperature varies.

Efforts have been made in the past to design Mach-Zehnder interferometers and other fiber optic devices so as to achieve high thermal stability and minimize temperature variations and other thermal effects.

For example, U.S. Pat. No. 4,725,141 provides an all-fiber MZI with connecting fibers or arms between the couplers being of equal length and located close to each other, thus ensuring that the effects of temperature changes are minimized since both arms are equally affected by temperature variations. In such case, however, the connecting arms must be made of the same material and to achieve the required phase shift a transducer is coupled to at least one of the interferometer arms, which is not a very practical feature.

U.S. Pat. No. 6,118,909 discloses a different manner by which optical devices having a plurality of waveguides of differing lengths, such as wavelength routers, may be treated to achieve improved temperature independence. This is done by applying a temperature-compensating material, such as a polymer, on selected areas of the device thereby varying the cross-sections of the waveguides to improve temperature independence. Such procedure is not straightforward, since it is difficult to access the evanescent field, i.e. to apply the polymer near the core of the fiber.

Finally, U.S. Pat. No. 6,031,948 describes a temperature compensation technique of an all-fiber Mach-Zehnder interferometer, where two connecting fibers are of different lengths. This is achieved by mounting the shorter fiber on a composite substrate, such that, as temperature rises, the substrate expands to increase the tension and length of the shorter fiber in order to maintain a constant path length difference, or the longer fiber is mounted on a composite substrate such that, as the temperature rises, the substrate contracts to decrease the tension and length of the longer fiber and thereby preserve the desired path difference. This is essentially a packaging technique, which proves to be complex, since it requires delicate adjustments and mechanical fabrication, for example, when the connecting fibers between the couplers are essentially of the same length.

Thus, there is still a need for an all-fiber MZI with a passive thermal compensation that would allow controlling the thermal dependence of the device within a desired temperature range in a precise and accurate way, without adding complexity to the packaging of the component.

OBJECTS AND SUMMARY OF THE INVENTION

It is an object of the present invention to provide an improved passively thermally compensated all-fiber MZI.

A further object is to provide a method for enabling a passive control of the thermal properties of an all-fiber MZI.

Other objects and advantages of the invention will be apparent from the following description thereof.

In essence, the present invention comprises an all-fiber Mach-Zehnder interferometer having two optical couplers and two arms made of optical fibers extending between and connecting said couplers, so as to form a phase shift region between said couplers with a predetermined optical path length difference defined either by a difference in the indices of refraction of the two fibers, or by a difference in geometrical length between the two couplers, the composition of at least a segment of one or both of said arms being so doped as to provide a desired thermal dependence in the MZI within a predetermined temperature range. The doped composition compensates for a temperature induced shift, while maintaining the optical path length difference unchanged as the temperature varies within said temperature range.

The adjustment of the composition with dopants can take place in the core of the fiber or in the cladding or both. The type of dopant used and its dosage can be selected to control the thermal wavelength drift of the MZI with about 1–2 picometer/° C. accuracy within a desired temperature range which is normally between about −35° C. and +85° C. In both cases, namely with equal length arms and with different length arms, additional fine tuning may be obtained by providing one of the arms with an adiabatic taper, thus further increasing the accuracy of the thermal dependence. Combinations of dopants such as Ge—P or Ge—B are preferred, but any suitable dopants may also be used to achieve the predetermined thermal dependence.

The method of the present invention comprises adjusting the composition of at least one connecting fiber between the couplers of the MZ structure with dopants, so as to achieve a predetermined thermal dependence. This can be done by splicing a length of a doped fiber into one or both connecting fibers. The actual testing procedure that may be used consists in placing the MZI in a heating-cooling enclosure and launching light from a broadband source (BBS) into the MZ device. The light is split, in the first coupler, into optical signals that propagate through the connecting fibers in the phase shift region and then are coupled again and taken out as an optical signal output from the second coupler. The heating-cooling enclosure is used to achieve a variable temperature within a desired range. The optical signal output is taken out of this enclosure, through a switch and into an optical spectrum analyser (OSA) by which the thermal dependence is measured at different temperatures. By using various doped fibers or splices between the couplers of the MZI, and measuring the thermal dependence at various temperatures, one can control such thermal dependence within the given temperature range by selecting doped fibers of appropriate composition. A proper modelling of the thermal properties of the fibers allows designing interferometers with the desired thermal characteristics without further iterations.

In this manner, it is possible to achieve designs that make use of fiber compositions suitable to produce temperature-controlled MZ devices with connecting arms between the couplers of equal length that have an optical path difference to produce the MZ effect, or with connecting fibers of different lengths, for instance in a crescent-like configuration.

In an output arm of the MZI, the condition for observing a maximum or a minimum of transmitted power is generally written as:

$$k_0 \left( \int_0^{L_1} N_1 dz_1 - \int_0^{L_2} N_2 dz_2 \right) = m\pi \quad (1)$$

where $k_0 = 2\pi/\lambda$ is the wave number, $\lambda$ being the wavelength in vacuum; $N_1$ and $N_2$ are the effective indices of the optical fibers in the first and second arm respectively of the interferometer; $L_1$ and $L_2$ are the lengths of the first and second arm respectively of the interferometer; $z_1$ and $z_2$ are integration variables along the length of the first and second arm, respectively; and m is an integer.

The thermal dependence of an MZI is calculated by differentiation of equation (1) with respect to wavelength $\lambda$, temperature T and lengths $L_1$ and $L_2$. The result can be expressed in the following form:

$$d\lambda = \frac{\Delta\lambda}{\lambda} \left[ \left( \int_0^{L_1} \frac{\partial N_1}{\partial T} dz - \int_0^{L_2} \frac{\partial N_2}{\partial T} dz \right) dT + \right. \quad (2)$$

$$\left( L_1 \int_0^{L_1} \frac{\partial N_1}{\partial \varepsilon_1} \varepsilon_1 dz - L_2 \int_0^{L_2} \frac{\partial N_2}{\partial \varepsilon_2} \varepsilon_2 dz \right) +$$

$$\left. \left( L_1 \int_0^{L_1} N_1 \varepsilon_1 dz - L_2 \int_0^{L_2} N_2 \varepsilon_2 dz \right) \right]$$

where $\Delta\lambda$ is the fringe spacing, i.e. the wavelength separation between two transmission peaks in one given output port of the interferometer; $\varepsilon_1$ and $\varepsilon_2$ are the unitary elongations of the arms 1 and 2, caused by thermal expansion of either the fiber or of the substrate.

The fringe spacing is found by the following equation:

$$\Delta\lambda = \frac{\lambda^2}{\int_0^{L_1} N_{g1} dz_1 - \int_0^{L_2} N_{g2} dz_2}$$

where $N_{g1}$ and $N_{g2}$ are the group effective indices in the arms 1 and 2 respectively.

In equation (2), the brackets in the first line encompass the thermo-optic effect, the second line describes the elasto-optic effect (which is the change of index of refraction under elongation) and the third line, the optical path-length change under elongation. The elongations $\varepsilon_1$ and $\varepsilon_2$ are functions of $z_1$ and $z_2$ respectively and describe a change in length such that:

$$\varepsilon = \frac{dL}{L}$$

where L is the length of a small segment along the fiber.

In the case of two arms of different lengths $L_1$, $L_2$, the wavelength shift is determined both by the thermo-optic effect and the differential expansion between the two arms. The thermo-optic effect is dominant and is expressed as follows:

$$\left( L_1 \frac{\partial N_1}{\partial T} - L_2 \frac{\partial N_2}{\partial T} \right)$$

When the difference in geometrical length between the two arms is not too large, typically in the range of about 1 mm for a spacing of 100 GHz, a small difference in dn/dT suffices to compensate for the thermal unbalance. This dn/dT is controlled by the composition of the fibers.

In the case of two optic fibers of equal lengths, $L_1 = L_2 = L$, the thermal wavelength drift is dominated by the thermo-optic effect embodied by the first term of the above relation. The condition to obtain an athermal MZI is that the difference in parentheses in said term be equal to zero, that is $$L_1 \frac{\partial N_1}{\partial T} = L_2 \frac{\partial N_2}{\partial T}.$$

It is still possible to choose other values for this difference so as to achieve a desired thermal dependence.

The present invention makes it possible to achieve designs that make use of precise fiber compositions either to produce temperature-controlled MZI devices with equal length arms in a parallel configuration or MZI devices with different length arms, for instance in a crescent-like configuration.

This invention will be more fully disclosed in the following detailed description taken together with the accompanying drawings.

DETAILED DESCRIPTION OF THE PREFERRED EMBODIMENTS

Figure 1:
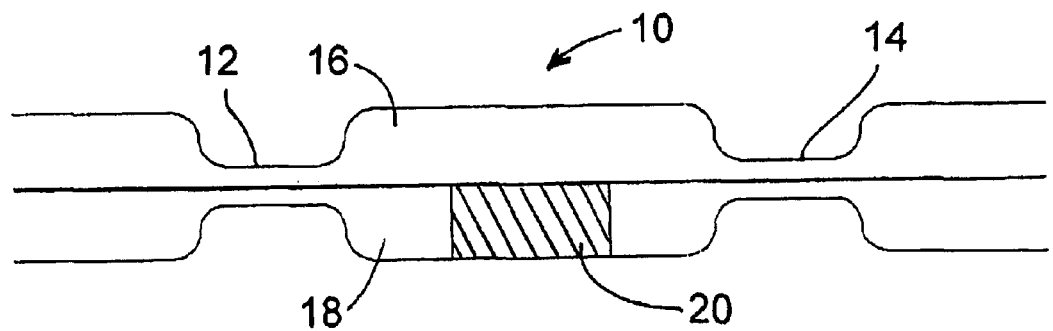
FIG. 1 is a schematic representation of a Mach-Zehnder interferometer having two arms of equal length between the couplers and having an insert in one of the arms allowing control of thermal dependence of the MZI.

In the drawings, the same elements are identified by the same reference numbers.

The embodiment shown in FIG. 1 illustrates a Mach-Zehnder interferometer 10 having two couplers 12 and 14 interconnected by two equal length arms 16 and 18 made of a standard SMF 28 fiber of index of refraction $N_1$. The length of fiber 16 ($L_1$) is equal to the length of fiber 18 ($L_2$) and thus $L_1=L_2$. In this embodiment, fiber 18 has a segment 20 of length $L_3$ made of a different fiber, having a different index of refraction $N_2$, which produces the desired thermo-optic effect. It is already known, for instance from U.S. Pat. Nos. 5,943,458 and 6,031,948, that a phase shift region between the couplers of a Mach-Zehnder device can be achieved by using equal length arms, but inserting in at least one of these arms a segment of a fiber with a different index of refraction, thereby producing a difference in optical path length between the two arms, required to form a Mach-Zehnder effect. However, what was not known and constitutes a surprising discovery of the present invention, is that by properly adjusting with dopants the composition of the insert of the fiber of different index of refraction $N_2$, one can also control the thermal dependence of the MZI.

Thus, for fibers of equal lengths $L_1=L_2$, the wavelength spacing of the MZI depends only on the difference between the effective indices of refraction of the two arms, and the temperature dependence of the wavelength of any channel on the difference between the thermo-optic coefficients of the two arms.

In the embodiment of FIG. 1, the SMF-28 fiber of the first arm 16 has a fixed thermo-optic coefficient of about $8-10^{-6}/°$ C. To achieve the objective of the present invention, the composition and length $L_3$ of the segment 20 of dissimilar fiber, which has been spliced in the fiber of the second arm 18, is so adjusted with dopants as to obtain simultaneously a similar thermo-optic coefficient $dn/dT$, but a different index of refraction than that of the arm 16. A range of dopants, dopants such as $GeO_2$, $P_2O_5$, $B_2O_3$, F, can be used for this purpose. It is known, for example, that $GeO_2$ in amounts of up to 40 wt % has the effect of increasing both the thermo-optic coefficient $dn/dT$ and the index of refraction, whereas $P_2O_5$ in amounts of up to 20 wt % has the effect of decreasing the thermo-optic coefficient $dn/dT$ and of increasing the index of refraction, while $B_2O_3$ in amounts of up to 7 wt % has the effect of decreasing both the thermo-optic coefficient $dn/dT$ and the index of refraction. With this knowledge, one can use mixtures of Ge—P or Ge—B doping, such as for example 30% $GeO_2$ and 6.5% $B_2O_3$ in the spliced segment 20 within fiber 18 to produce the desired Mach-Zehnder effect with controlled thermal dependence. The MZI device thus designed is fixed on a substrate and suitably tensioned, with a unitary elongation $\Delta L/L$ preferably above 0.025%, or even above 0.05% to make it stable. The variation in length of the substrate in relation to temperature does not affect such design, since the lengths $L_1$ and $L_2$ being equal, will undergo exactly the same variations. The thermal wavelength drift of the MZI can thus be controlled within an accuracy of 1 to 2 pm/° C.

Figure 2:
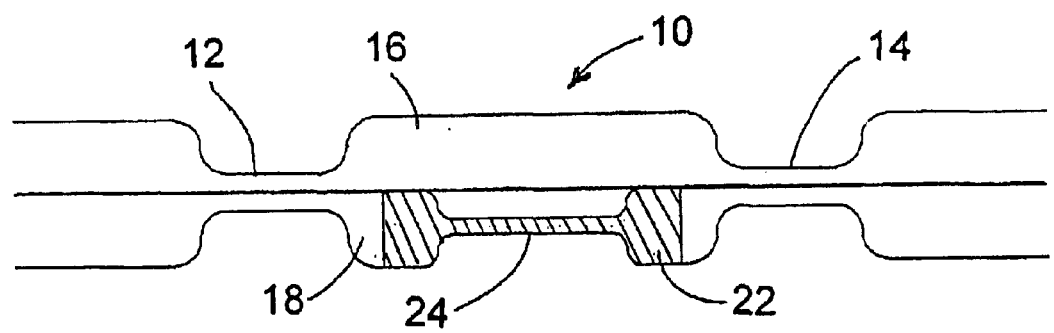
FIG. 2 is a schematic representation of a Mach-Zehnder interferometer similar to that shown in FIG. 1, but also having a taper in the insert of one of the arms used to fine tune the accuracy of thermal dependence of the MZI.

The embodiment of FIG. 2 is a variant of that described with reference to FIG. 1. Here, however, in addition to inserting a segment 22, of a different fiber within arm 18 between couplers 12 and 14, this segment 22 is provided with an adiabatic taper 24. In such tapered sections, the optical signal is not guided by the core of the fiber, but by the cladding, which has a $dn/dT$ coefficient inferior to that of the core and the index of refraction smaller than that of the core. This provides a way of using such taper to better control the temperature dependence of the MZ device 10, for example by fine-tuning the original setting of FIG. 1. This design can also be used with dissimilar fibers of which the thermo-optic coefficient $dn/dT$ is not too different, such as SMF-28 produced by Corning and INO 500 produced by Institut National d'Optique and Redfern GF2 produced by Redfern. In such cases, it suffices to determine the optimal taper length $L_1$ in order to obtain an overall $dn/dT$ coefficient equal to that of the core of fiber SMF-28.

Thus, in this particular example, the fiber of arm 16 is chosen as being SMF-28 and the fiber of insert 22 is chosen so as to have a thermo-optic coefficient $dn/dT$ and the index of refraction $N_2$ superior to those of the SMF-28 fiber. For instance, INO 500 (Ge—P/$SiO_2$) or Redfern GF2 (Ge—B/$SiO_2$) are suitable for this purpose. The insert 22 made of such doped fiber is tapered with a adiabatic taper 24 so that in this tapered region the optical signal is guided by the cladding of which the thermo-optic coefficient $dn/dT$ is inferior to that of SM-28 fiber and of which the index of refraction is slightly inferior to that of the SMF-28 fiber. The length of the taper 24 is then adjusted so that the overall thermo-optic coefficient of the second arm 18 is equal to that of the first arm 16 and so that the index of refraction $N_2$ of the second arm 18 is superior to the index of refraction $N_1$ of the first arm 16. The device is then mounted on the substrate as described with reference to the embodiment of FIG. 1 and shows similar temperature stability of the order of 1 to 2 pm/° C.

It should be noted however, that this particular embodiment is applicable only when the thermo-optic coefficients of the two types of fibers are sufficiently close to ensure a maximum thermal dependence of the device of the order of 20 pm/° C. in the absence of the tapered region in the second arm.

It should also be mentioned that it is generally known to provide a taper in one of the arms of a Mach-Zehnder interferometer to achieve an optical path-length difference between the two interferometer arms. This is described, for instance, in the article entitled "Ultraviolet-light photosensitivity in $Er^{3+}$—GE-doped optical fiber" by F. Bilodeau et al., published in Optics Letters, Vol. 15, No. 20 Oct. 15, 1990. However, again it was not realized that such design, when properly adjusted with dopants, could also provide temperature dependence control of the MZ device.

Figure 3:
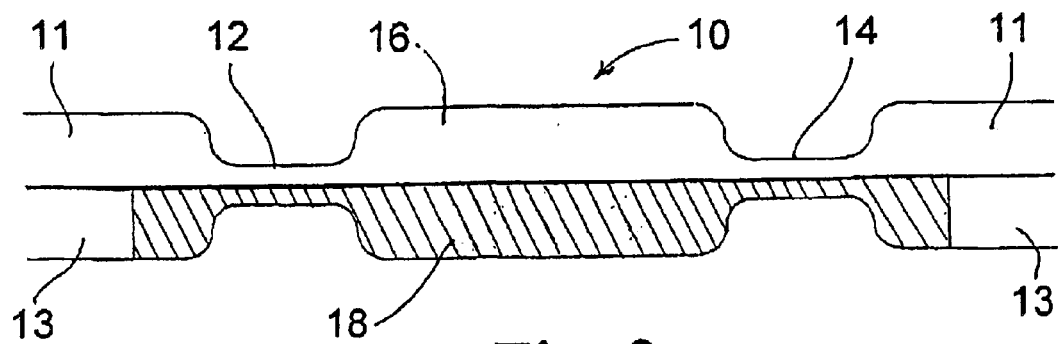
FIG. 3 is a schematic representation of a Mach-Zehnder interferometer having equal arms and an insert of a different fiber in one of the arms, which insert extends beyond the couplers of the MZI.

The embodiment shown in FIG. 3 is another variant of a Mach-Zehnder interferometer 10 having equal length arms 16 and 18 between the couplers 12 and 14. In this case, however, the fiber of arm 16 is of the same composition as the input-output fiber 11, for instance SMF-28, while the fiber of arm 16 is dissimilar and is provided with the required dopant to achieve the desired thermo-optic coefficient dn/dT to control the temperature dependence of the device 10. The dissimilar arm 18 is part of a different fiber spliced into the input-output fiber 13 outside of the couplers 12 and 14 respectively. The couplers here are made with dissimilar fibers and are thus dissymmetric couplers. Again, it is already known to use such dissimilar fibers to produce the unbalanced effect in the phase shift region of the Mach-Zehnder interferometer while having equal length arms between the couplers. This is disclosed, for instance, in U.S. Pat. No. 5,295,205 and in the article entitled "Unbalanced Dissimilar-Fibre Mach-Zehnder Interferometer: Application as filter" by B. Malo et al. published in Electronics Letters, Vol. 25, No. 21, 12 Oct. 1989. But it was not previously recognized that such design, with one of the arms having a fiber composition properly adjusted with dopants, could provide control of temperature dependence in the MZI device.

Figure 4:
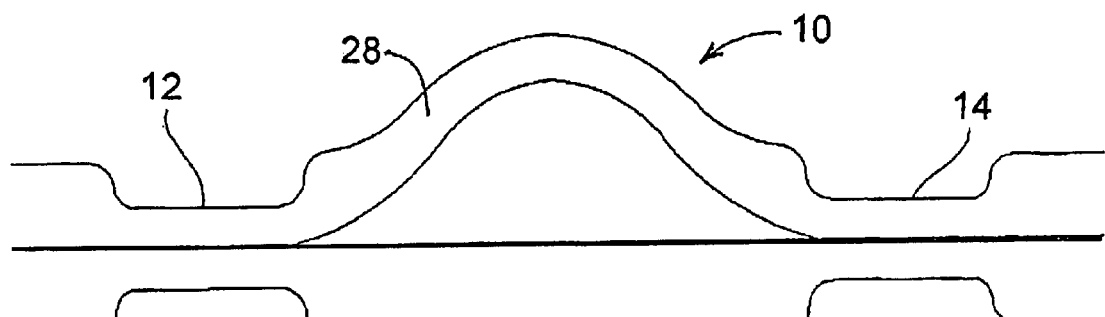
FIG. 4 is a schematic representation of a Mach-Zehnder interferometer having one arm longer than the other between the couplers, wherein the fibers of the two arms are dissimilar and their composition is chosen to provide control of thermal dependence of the MZI.

In the embodiment of the invention illustrated in FIG. 4, the Mach-Zehnder interferometer 10 has arms 26 and 28 of different lengths $L_1$ and $L_2$, between the couplers 12 and 14. In such a design, the temperature-induced wavelength shift is determined by the thermo-optic effect and by the differential expansion between the two arms. The thermo-optic effect is dominant, expressed as:

$$\left( L_1 \frac{\partial N_1}{\partial T} - L_2 \frac{\partial N_2}{\partial T} \right)$$

When the difference in the geometrical length between the two arms 26 and 28 is not too large, typically in the range of about 1 mm for a spacing of 100 GHz, a small difference in dn/dT suffices to compensate for the thermal unbalance. If a standard SMF-28 fiber of index of refraction $N_1$ is used for the first arm 26 of length $L_1$, the second arm 28 of length $L_2$ may consist, for example, of P-doped silica with 5 to 10% wt $P_2O_5$, so as to cancel the thermo-optic effect in the following way:

$$L_1 \frac{\partial N_1}{\partial T} = L_2 \frac{\partial N_2}{\partial T}$$

The interferometer is then mounted on a substrate in the usual way, that is with two adhesive points on each side of the coupling region, said region being fixed by means of flexible gel. In such a way, temperature dependence of the MZI device 10 is controlled within an accuracy of 0.2 to 1 pm/° C. Compared to the planar designs disclosed previously, this embodiment has the advantage of allowing more flexibility in the composition on the second arm. A variant of this embodiment consists in tapering a region of the fiber in one of the two arms to achieve the desired thermal dependence.

Figure 5:
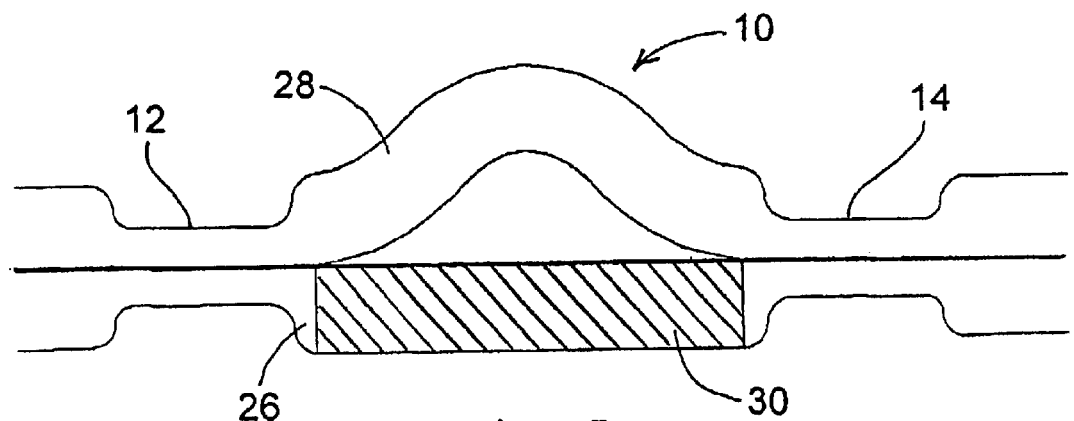
FIG. 5 is a schematic representation of a Mach-Zehnder interferometer having one arm longer than the other between the couplers, wherein the fiber of the shorter arm has a segment of a different fiber composition to provide control of thermal dependence of the MZI.

Still another variant of the embodiment shown in FIG. 4, is illustrated in FIG. 5. Here, rather than having entirely different fibers 26 and 28 for the two arms between the couplers 12 and 14, arm 26 is provided with an insert 30 of a different, doped composition, such as to cancel the thermo-optic effect and produce an MZI device 10 with controlled temperature dependence.

Figure 6:
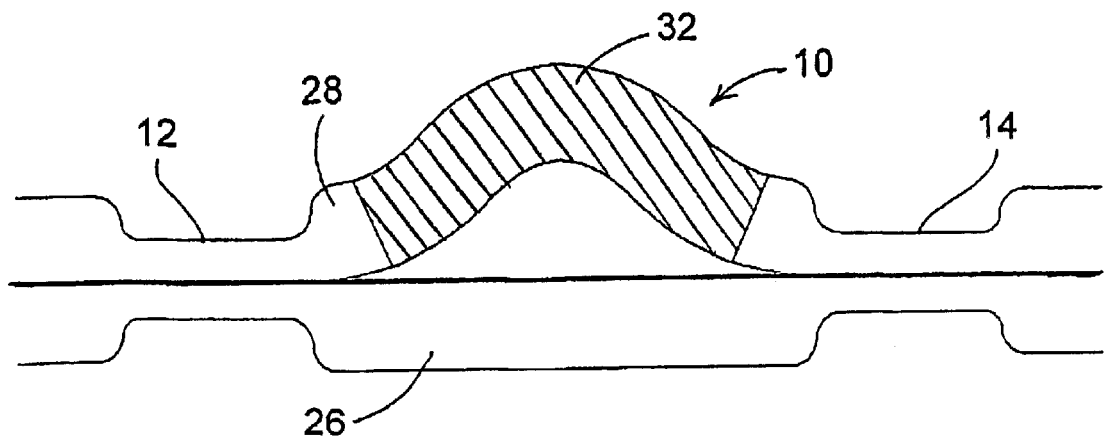
FIG. 6 is a schematic representation of a Mach-Zehnder interferometer having one arm longer than the other between the couplers, wherein the fiber of the longer arm has a segment of a different fiber composition to provide control of thermal dependence of the MZI.

A further variant is illustrated in FIG. 6, where the longer arm 28, between couplers 12 and 14, is provided with an insert 32 of a different, doped composition, such as to cancel the thermo-optic effect and provide an MZI device 10 with a controlled temperature dependence.

Figure 7:
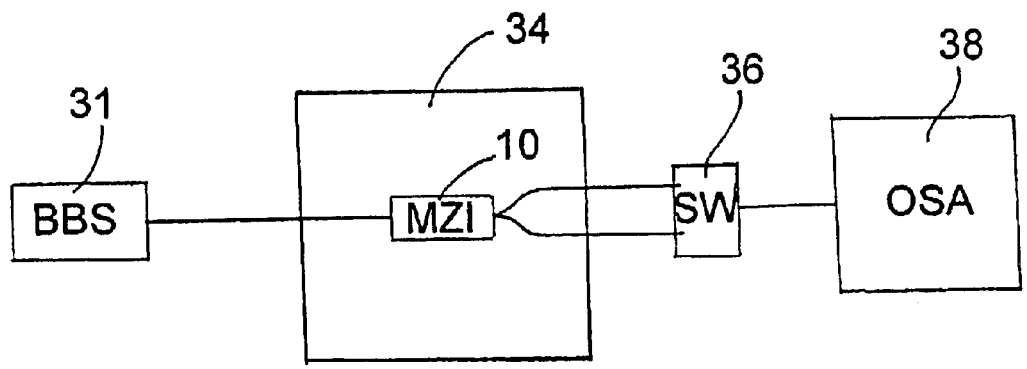
FIG. 7 is a schematic representation of a method used to achieve measurement and control of thermal dependence of a Mach-Zehnder interferometer in accordance with the present invention.

The method of testing the various designs of Mach-Zehnder interferometers described above and illustrated in FIGS. 1 to 6 is shown in FIG. 7. According to this method, the MZI device 10 of a given design is placed in a heating-cooling enclosure 34 where it can be heated and cooled within a predetermined range of temperatures, for example between −35° C. and +85° C.

A BBS broadband source 31 is used to launch a light signal into the MZI device 10 which is heated and cooled within the desired range of temperatures. The signals are processed by the MZI 10 and pass through switch 36 and into the OSA optical spectrum analyser 38 where the thermal dependence of the device 10 is measured within the predetermined range of temperatures generated in the enclosure 34. The composition of the arms within the MZI can thus be adjusted by design to achieve the desired result.

Figure 8:
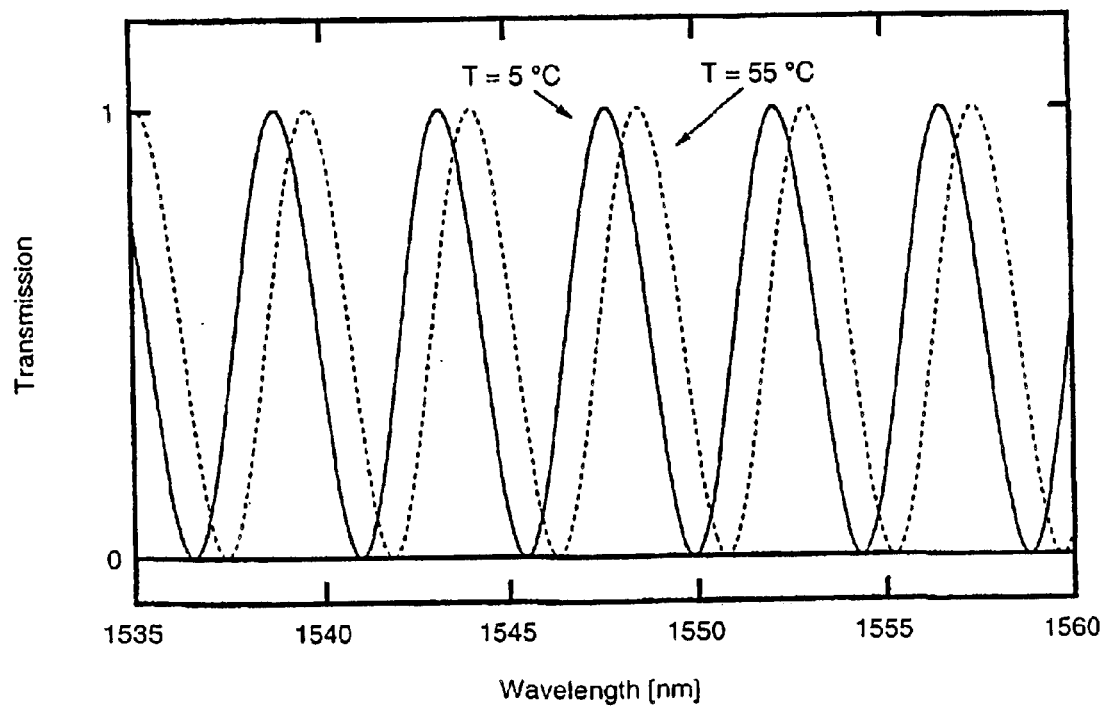
FIG. 8 is a graph showing a characteristic sinusoidal transmission spectra at one of the output arms of a Mach-Zehnder device having different fibers as arms, at 5° C. and 55° C. respectively, without thermal compensation provided by the present invention.

An example of such measurement by OSA 38 of a characteristic sinusoidal transmission spectrum at one of the output arms of MZI 10, is illustrated by the graph of FIG. 8. This measurement is made at 5° C. and 55° C. respectively in an MZI having arms which are made of fibers of different lengths, without thermal compensation provided by the present invention. As shown in this graph, there is a shift between the transmission peaks and minima at the different temperatures. Thus, as the temperature decreases, the peaks and minima shift to lower wavelengths.

Figure 9:
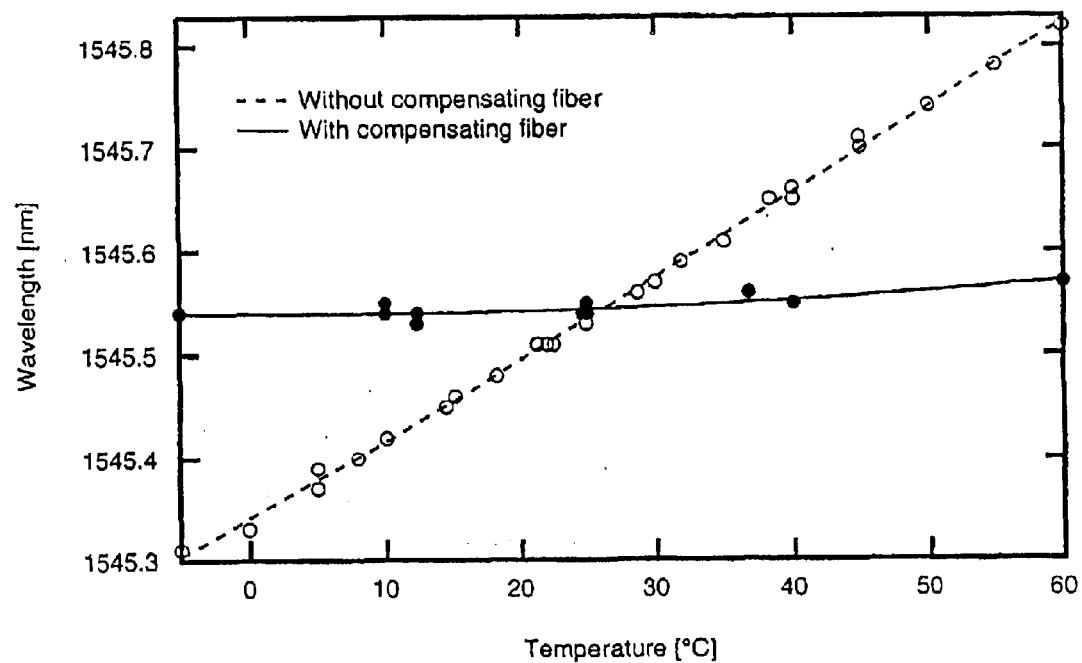
FIG. 9 is a plot of wavelength values as a function of temperature for a Mach-Zehnder device without a compensating fiber and with a compensating fiber pursuant to the present invention.

FIG. 9 represents an actual plot of the temperature dependent shifts at temperatures between −5° C. and +60° C. of two identically shaped MZI devices (crescent shape) with arms of different lengths and with one of the devices being provided with an insert for thermal compensation according to this invention. The MZI devices had about 50 GHz of wavelength spacing between channels.

The first MZI device was fabricated entirely from SMF-fiber without any thermal compensation and the measurements of wavelength versus temperature are plotted with empty circles and a broken line in FIG. 9. This MZI device has a thermal dependance of 8 pm/° C.

The second MZI device was fabricated with an insert in the long arm as shown in FIG. 6. The insert was 42 mm long and consisted of a doped fiber containing 12% by wt of $P_2O_5$ in its core. The measurements of wavelength versus temperature of this device are plotted with black circles and a solid line in FIG. 9 and show a thermal dependence of only 0.5 pm/° C. It is clear from this plot that thermal compensation in accordance with the present invention produces significantly improved results.

Figure 10:
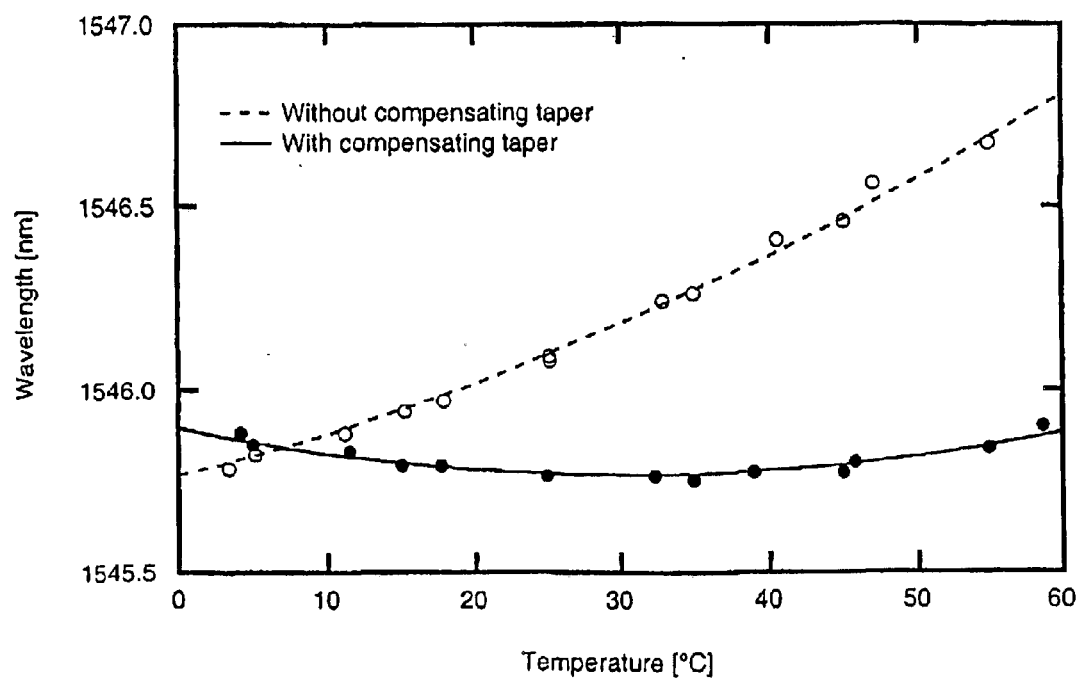
FIG. 10 is a plot of wavelength values as a function of temperature for a Mach-Zehnder device without a compensating taper in one of the arms, and with a compensating taper pursuant to the present invention.

FIG. 10 represents another plot of two MZI devices in which the arms are of equal length and where the thermal compensation is improved by means of a taper as illustrated in FIG. 2. The MZI device as illustrated in FIG. 1, having an insert of fiber INO-500, produced measurements shown in FIG. 10 by empty circles and a brocken line, while the improved MZI device as illustrated in FIG. 2, having an insert of fiber INO-500 and an adiabatic taper in the insert, produced measurements shown by black circles and a solid line in FIG. 10. It is clear from this plot that the fine-tuning of the MZI device by means of an adiabatic taper produces improved thermal compensation.

The invention is not limited to the specific embodiments described above, but obvious modifications may be made by those skilled in the art without departing from the invention and the scope of the following claims.

What is claimed is:

1. An all-fiber Mach-Zehnder Interferometer (MZI) having two optical couplers and two arms made of optical fibers extending between and connecting said couplers so as to form a phase shift region between said couplers with a predetermined optical path length difference, characterized in that the composition of at least a segment of one or both of said arms is so doped with a dopant comprising $P_2O_5$ as to provide a desired thermal dependence in the MZI within a predetermined temperature range.

2. An all-fiber MZI according to claim 1, wherein the two arms are of equal length and both the phase shift and the desired thermal dependence are achieved by inserting a segment of a suitably doped fiber comprising $P_2O_5$ dopant in at least one of the arms.

3. An all-fiber MZI according to claim 2, wherein the segment of the doped fiber is adapted to make thermo-optic coefficient dn/dT of one of the arms similar to that of the other arm, while simultaneously producing different refractive indices in the two arms to maintain the predetermined optical path length difference.

4. An all-fiber MZI according to claim 2, further having an adiabatic taper in the segment.

5. An all-fiber MZI according to claim 1, wherein the two arms are of equal length and are formed of dissimilar fibers extending beyond the couplers at each end of the phase shift region, so that the couplers are asymmetric, the composition of one of both of said arms being doped with the dopant comprising $P_2O_5$ to provide the desired thermal dependence.

6. An all-fiber MZI according to claim 1, wherein the two arms are of different length, and are made of fibers of different composition, at least one of said fibers being so doped with the dopant comprising $P_2O_5$ as to provide the desired thermal dependence.

7. An all-fiber MZI according to claim 1, wherein the two arms are of different lengths, thus forming a longer arm and a shorter arm, and a segment of a suitably doped fiber comprising $P_2O_5$ dopant is inserted in the shorter arm to provide the desired thermal dependence.

8. An all-fiber MZI according to claim 1, wherein the two arms are of different lengths, thus forming a longer arm and a shorter arm, and a segment of a suitably doped fiber comprising $P_2O_5$ dopant is inserted in the longer arm to provide the desired thermal dependence.

9. An all-fiber MZI according to claim 7, wherein the segment is tapered with an adiabatic taper.

10. An all-fiber MZI according to claim 1, wherein the fiber is doped with a combination of dopants consisting of $P_2O_5$ and $GeO_2$.

11. Method of providing passive thermal compensation in an all-fiber MZI which has two optical couplers and two arms made of optical fibers extending between and connecting said couplers so as to form a phase shift region between said couplers with a predetermined optical path length difference, said method comprising adjusting the composition of at least a segment of one or both of said arms with a dopant comprising $P_2O_5$ so as to obtain a desired thermal dependence of the MZI within a predetermined temperature range.

12. Method according to claim 11, wherein the adjustment is done by placing the MZI in a heating-cooling enclosure, launching a light signal thereinto, and analyzing the signals processed by the MZI at various temperatures while adjusting the composition of at least a segment of one or both arms with the dopant comprising $P_2O_5$ until the desired thermal dependence is obtained.

13. Method according to claim 12, wherein the temperature range within the heating-cooling enclosure is set between −35° C. and +85° C.

14. Method according to claim 11, further comprising tapering the segment with an adiabatic taper.

15. Method according to claim 11, wherein the composition is adjusted with a combination of dopants consisting of $P_2O_5$ and $GeO_2$.

16. An all-fiber MZI according to claim 3, further having an adiabatic taper in the segment.

17. An all-fiber MZI according to claim 8, wherein the segment is tapered with an adiabatic taper.

18. Method according to claim 12, further comprising tapering the segment with an adiabatic taper.

19. Method according to claim 12, wherein the composition is adjusted with a combination of dopants consisting of $P_2O_5$ and $GeO_2$.

20. An all-fiber MZI according to claim 1, wherein the desired thermal dependence is provided with a controlled accuracy of 0.2 to 1 pm/° C.

* * * * *